United States Patent [19]
Tee et al.

[11] 3,934,937
[45] Jan. 27, 1976

[54] NEW ROTARY VALVE

[75] Inventors: Liong S. Tee, Westmont, Ill.; Carlo Piazza, deceased, late of Naperville, Ill.; by Judith B. Piazza, executrix, Naperville, Ill.

[73] Assignee: Standard Oil Company, Chicago, Ill.

[22] Filed: Sept. 27, 1971

[21] Appl. No.: 183,961

[52] U.S. Cl. ............... 302/14; 222/368; 302/49
[51] Int. Cl.² ................................. B65G 53/46
[58] Field of Search ........ 222/368, 194; 302/15, 49, 302/14; 210/405, 459; 209/271, 361

[56] References Cited
UNITED STATES PATENTS

| | | |
|---|---|---|
| 1,245,868 | 11/1917 | Caffey .......................... 302/49 X |
| 2,126,425 | 8/1938 | Thompson et al. ............ 222/368 |
| 2,890,079 | 6/1959 | Stumpf ............................. 302/49 |
| 3,367,544 | 2/1968 | Formando ....................... 222/368 |

FOREIGN PATENTS OR APPLICATIONS

| | | | |
|---|---|---|---|
| 556,880 | 7/1932 | Germany | 222/368 |
| 638,730 | 3/1962 | Canada | 222/368 |

*Primary Examiner*—Evon C. Blunk
*Assistant Examiner*—Jeffrey V. Nase
*Attorney, Agent, or Firm*—James R. Henes; Arthur G. Gilkes; William T. McClain

[57] ABSTRACT

A new rotary valve for metering solid slurries.

2 Claims, 5 Drawing Figures

INVENTORS.
Liong S. Tee
Carlo Piazza

BY Morando Brunetti

ATTORNEY

NEW ROTARY VALVE

INTRODUCTION

This invention relates to a new rotary valve for metering solid-liquid slurries.

Rotary valves are well known means for metering solids in gas-solid systems. Such valves include in combination an enclosed housing provided with solids entry and exit ports and a rotor contained within the housing. The rotor is made up of a drive shaft, a portion of which extends through the housing and blades extending from the total length of the drive shaft contained in the housing up to the inside surface of the housing in a sealing relationship. However, the formed seal does not permit rotation of the rotor during operation. Adjacent blades form pockets within the housing which meter gas-solid materials from the entry to the exit port during rotation of the rotor.

As noted, rotary valves of the type just described have been generally limited to gas-solid conveying systems.

The presently known rotary valves have not been applied to metering solid-liquid slurry systems since effective accumulation of solid material in a rotary valve pocket would primarily depend upon solid settling through a layer of liquid. Such accumulation would require unacceptably low metering rates. The alternative would be, of course, to operate at higher rotary speeds and thereby meter that solid portion which enters the valve pocket as part of the liquid-solid slurry. Operation under this alternative would result in possible inaccurate metering of material and generally inefficient operation.

Therefore, the present invention relates to a basic modification of the present industrially available rotary valve design which makes the new, modified valve especially well suited for the metering of solid-liquid slurries at either slow or rapid rates and at relatively high efficiencies.

OBJECTS

It is the main object of this invention to provide a new rotary valve suitable for metering solid-liquid slurries.

It is yet another object of this invention to provide a new rotary valve which will accurately meter the solid portion of such solid-liquid slurries at either slow or rapid throughputs while maintaining relatively high efficiencies.

Other objects and advantages of the invention will become apparent upon reading the following detailed description and upon reference to the drawings in which:

FIG. 1b is the side cross-sectional view of the rotary valve shown in FIG. 1a.

THE INVENTION

Figure 1B:
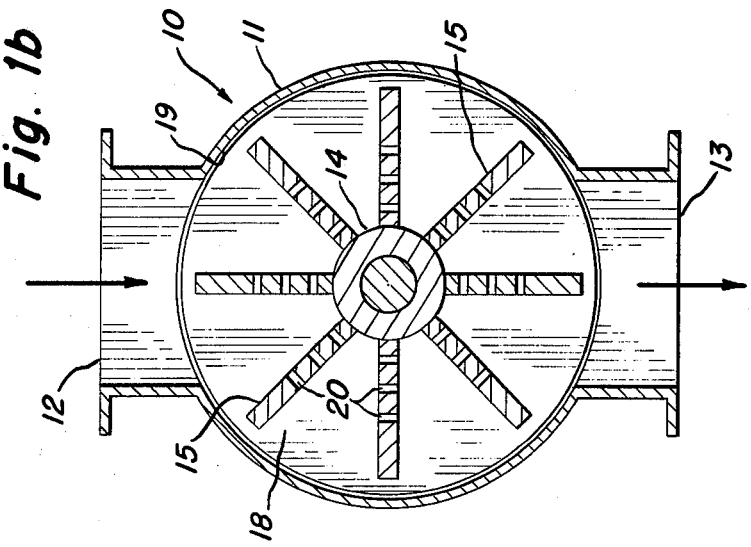

This invention is directed to a rotary valve adapted for metering solid-liquid slurries. The rotary valve of this invention comprises in combination an enclosed housing provided with entry and exit ports and a rotor.

The rotor contained in the housing is made up of at least two blades and a drive shaft, a portion of which passes through the housing. All of the blades of the rotor extend outwardly from along the length of the drive shaft portion passing through the housing towards the inside surfaces of the housing.

While two blades are said to be the minimum number of blades to be used in rotor construction, four to ten blades are preferred and eight blades are most preferred.

The rotor blades are constructed so that a portion of their surface area is perforated with openings which are smaller than the particles making up the solid portion of the slurry. Preferably, the total openings of any given blade take up about 10% to about 70% of the total surface area of the blade. Most preferably, the perforated surface of the blade is that close to the drive shaft from which the blade extends.

Adjacent blades of the rotor form individual pockets. Therefore, as the rotor rotates, its pockets also rotating individually pass by the entry port causing liquid-solid slurry to flow into the pockets. Since the blades are perforated, the liquid portion of the slurry passes into the pocket, through the openings of the perforated adjacent blades defining the pocket and into and through adjacent pockets eventually finding its way to the exit port. As would be expected, the major portion of the liquid follows a path to the exit port which is in the direction in which the rotor is turning. As the liquid is flowing into and through the rotor pockets, solid particles not able to pass through the perforations are trapped and therefore accumulate in the valve pocket passing the entry port. Therefore, the mechanism by which the pocket is filled with solids is by the rapid slurry flow as opposed to solid settling through a liquid layer, i.e., gravity, if there were no perforations. This allows rotary valve operation at higher or lower throughputs with greater accuracy and efficiency.

After accumulation, the solid filled pocket continuing its rotation expels the solid material at the exit port.

Quite often liquid-solid slurry systems which are to be metered are made up of delicate solid particles which must not be damaged. For such slurry systems a preferred embodiment of this invention is utilized wherein the blades do not seal against the surface of the housing; such blades are rather maintained within a defined clearance from the housing surface. The clearance will vary with the size of the solid particles making up the slurry. However, to prevent the particles from being subjected to damaging shearing forces, the clearance is preferably about 1.5 to about 3 times the average diameter of the particles and most preferably about 2 times the average diameter. Such clearance also prevents plugging at the neck of the entry port of the valve which could otherwise result in jamming of the valve.

Figure 1A:
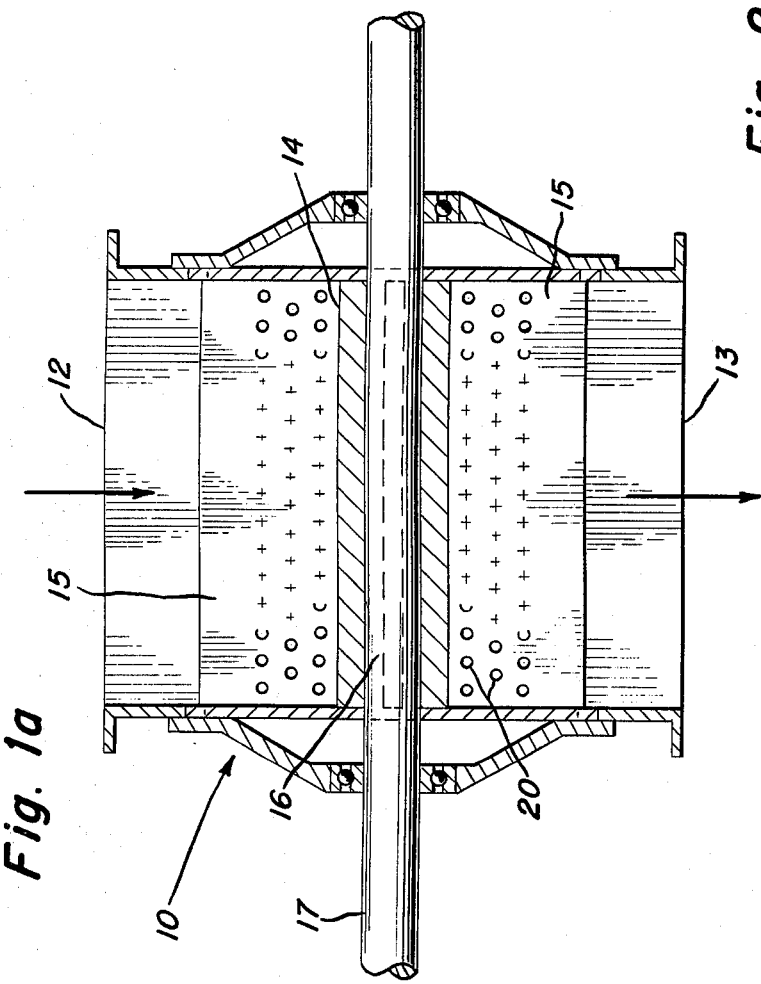
FIG. 1a is a front cross-sectional view of the rotary valve of this invention.

Turning now to FIGS. 1a and 1b, there is shown a rotary valve 10 embodying the features of this invention. In order to contain and convey solid-liquid slurry fed thereto, the rotary valve 10 includes an enclosed housing 11 provided with an entry port 12 and an exit port 13 and a rotor 14. The rotary valve material of construction can be any of such well known materials as cast iron, steel, plastics and the like.

Figure 2:
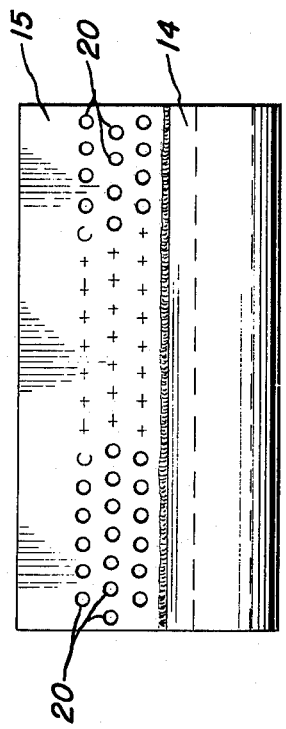
FIG. 2 is a front view of a single blade embodying the features of this invention.

The rotor 14 in this illustrative embodiment is shown to have 8 blades 15. The blades 15 extend both laterally and outwardly along that portion 16 of a drive shaft 17; the drive shaft portion 16 passes throughout the housing 11. The blades extend outwardly from the drive shaft portion 16 up to a point away from the inside housing surface 19 and laterally to the left and right side walls 18 which are integrally attached to the rotor blades 15. Each blade 15 is perforated with holes which are smaller than the solid particles of the solid-liquid slurry being conveyed. FIG. 2 shows a typical perforated blade 15 with openings 20 which take up about 10% to about 70% of the surface area of the blade.

Figure 3:
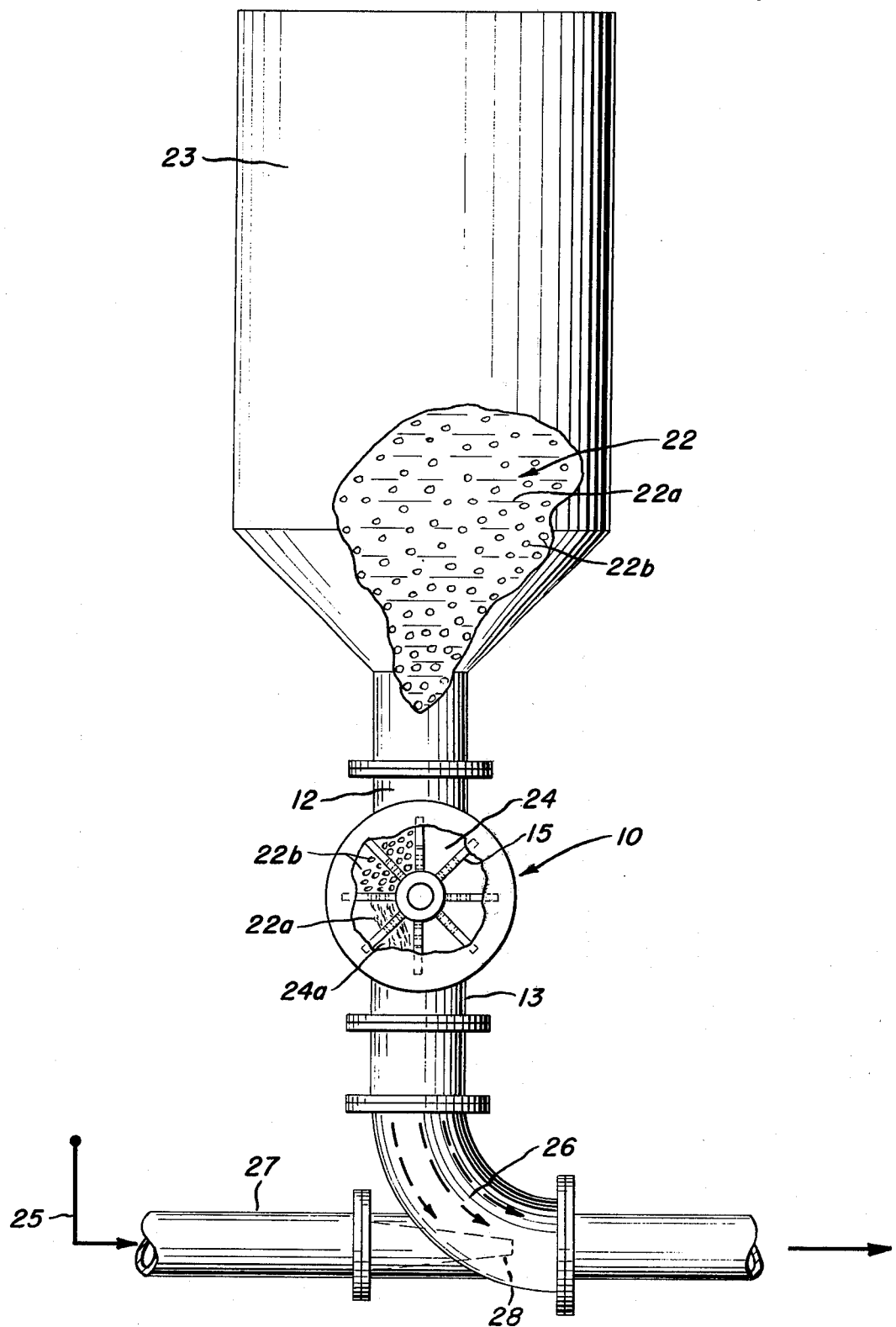
FIG. 3 is a schematic drawing of a typical portion of a process where the rotary valve of this invention may be used.

In order to illustrate the operation of the rotary valve 10 of this invention reference is made to FIG. 3 where the rotary valve 10 is shown in use as a metering means for the slurry system 22 made up of liquid 22a and solids 22b in column 23.

The rotary valve 10 is engaged with the base of column 23 at its entry port 12 and with line 27 at its exit port 13. During rotation of the rotary valve 10 pockets 24 formed by adjacent blades 15 pass by the entry port 12. Slurry 22 is fed to the pockets 24 as they individually pass by the entry port 12 during operation of the rotary valve 10. Since the blades defining the pockets 24 are perforated with openings 20, the major portion of the liquid 22a passes through the blades following the path of rotation, eventually reaching the exit port 13. The solids 22b of the slurry having particles of larger size than the perforated blade openings 20, accumulated in the pocket 24a as the liquid 22a passes therethrough, are expelled therefrom along with exiting liquid 22a into a motive stream 26 in line 27 by the action of gravity and the motive stream 26 as the pocket 24a passes the exit port 13.

The motive stream 26 in line 27 is created by an eductor 28 introducing a liquid 25, normally the same as that making up the slurry system, at high velocities into the line 27.

The motive stream having picked up solid and additional liquid continues through the line 27 to whatever other portions of the process may be necessary for completion of the process.

Preferably, in order to maximize operation efficiency of the rotary valve of this invention, defined as $$\frac{\text{Volume of Slurry Delivered per Revolution}}{\text{Total Rotor Volume Displaced per Revolution}} \times 100\%$$

the valve is operated at about 10 to about 100 RPM while the transferred liquid-solid product is subjected at the exit port to motive flows of about 190 to about 275 GPM.

Figure 4:
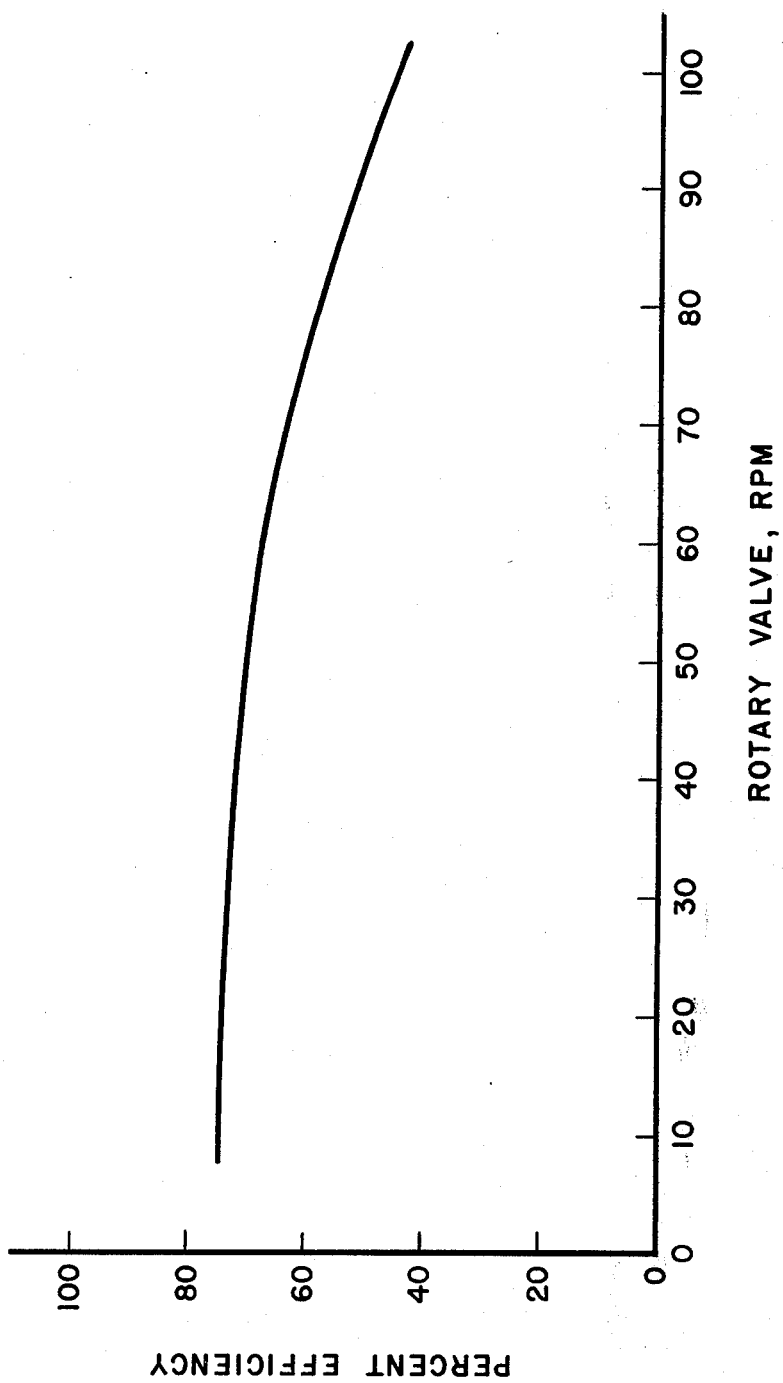
FIG. 4 is a plot showing efficiency relationships of the rotary valve of this invention.

Reference is made to FIG. 4 showing the relationship between percent efficiency and rotary valve speed for systems operating under the influence of motive flows of about 190 to about 275 GPM. FIG. 4 shows efficiencies of about 45% to 75% which in and of themselves are very good. However, it should be kept in mind that such efficiencies are based on slurry volumes which include void spaces between the particles. Therefore, as the particle size of the solids gets smaller, the void spaces decrease. In turn, the actual efficiency of the rotary valve with respect to solids delivery will increase. Further, it should be noted from FIG. 4 that relatively high efficiencies can be achieved at both high and low throughputs.

In order to obtain the data used to generate the curve shown in FIG. 4, a slurry made up of polyethylene beans (solids) and a hydrocarbon liquid was passed through a modified standard Model 8 inch × 6 inch rotary valve manufactured by Sprout-Waldron of Muncy, Pennsylvania with cast iron housing and a type-2 rotor. Such modification included machining of the blades of the rotor to provide a 0.5 inch blade clearance from the rotary valve housing. This clearance was provided to reduce shearing of the beans and prevent plugging at the neck of the rotary valve which could possibly result in jamming of the valve by the polyethylene beans having approximate diameter of about 6 mm. A 4 inch × 1 inch slot was cut in each blade close to the drive shaft portion from which they extended. Twelve (12) mesh screens were soldered over the slots on both sides of the various blades to provide the required perforated blade surfaces. The drive mechanism of the valve was set up so that the speed of the valve rotation could be varied from 10 RPM to 120 RPM. Note the perforated surface could also have been produced by drilling holes in the blade surface.

Thus, it is apparent that there has been provided in accordance with this invention a new rotary valve that fully satisfies the object, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the spirit of the scope and the intended claims.

Having described our invention, we hereby claim:

1. In combination with a rotary valve for metering solid-liquid slurries wherein said valve comprises an enclosed housing provided with entry and exit ports and a rotor contained and rotatable within said housing, said rotor being made up of 4 to 10 blades extending outwardly from along a portion of a drive shaft, said portion passing throughout the housing, towards the inside surface of said housing and said blades extending laterally towards left and right side walls, said walls providing left and right side enclosures for pockets formed by adjacent blades, wherein the improvement comprises:

screening means in the surfaces of said blades to permit the liquid of the solid-liquid slurry to flow rapidly from one pocket to an adjacent pocket and to retain the solids of the solid-liquid slurry so that such solids in one such pocket are trapped in such pocket until discharged through said exit port; and said blades extending towards the inside surface of said housing and extending laterally towards left and right side walls, but not touching or sealing against the surface of said hosuing or said side walls and leaving a clearance between the blades and said inside surface of said housing and said side walls to prevent the solids of the solid-liquid slurry from being subjected to damaging shearing forces between the blades and said inside surface of said housing and said side walls and to prevent plugging of said entry port with solids of the solid-liquid slurry.

2. The rotary valve of claim 1 where the screening means in any given blade take up 10% to about 70% of the total surface area of that blade.

* * * * *

UNITED STATES PATENT OFFICE
CERTIFICATE OF CORRECTION

Patent No. 3,934,937          Dated January 27, 1976

Inventor(s) Liong S. Tee, Carlo Piazza, Dec., and Judith B. Piazza

It is certified that error appears in the above-identified patent and that said Letters Patent are hereby corrected as shown below:

Column 1, line 15, "permit" should read -- prevent --.

Column 4, line 55, "hosuing" should read -- housing --.

Signed and Sealed this twentieth Day of April 1976

[SEAL]

Attest:

RUTH C. MASON
Attesting Officer

C. MARSHALL DANN
Commissioner of Patents and Trademarks